July 18, 1933.  C. W. VOGT  1,918,356
MACHINE FOR FEEDING AND SHAPING METALLIC TUBES
Filed May 16, 1930  9 Sheets-Sheet 1
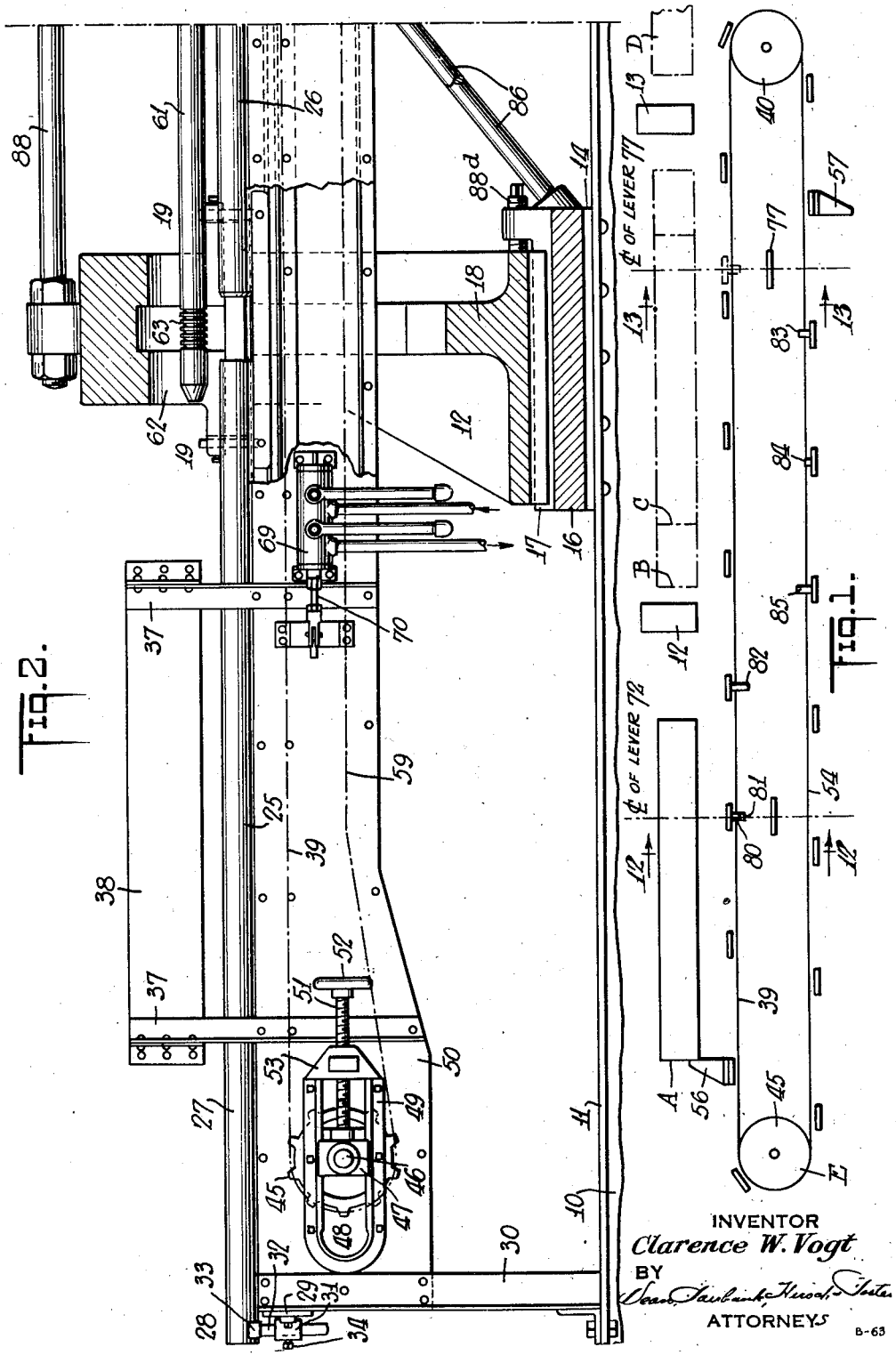
INVENTOR
Clarence W. Vogt
BY
ATTORNEYS

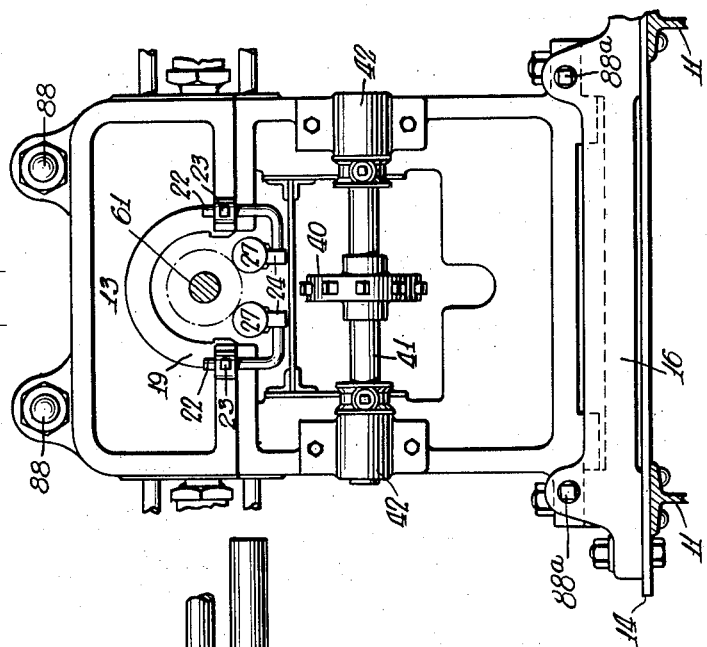
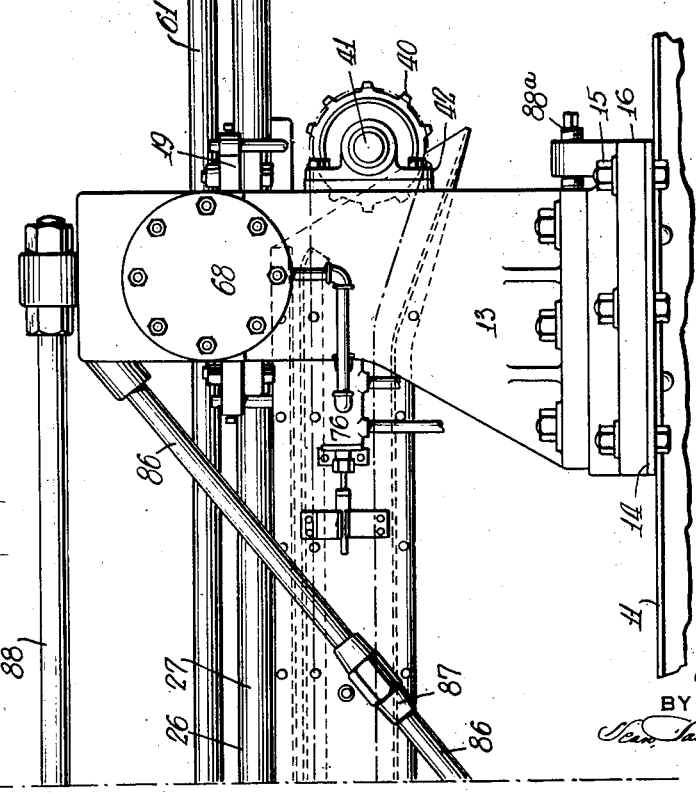

July 18, 1933.  C. W. VOGT  1,918,356
MACHINE FOR FEEDING AND SHAPING METALLIC TUBES
Filed May 16, 1930   9 Sheets-Sheet 3
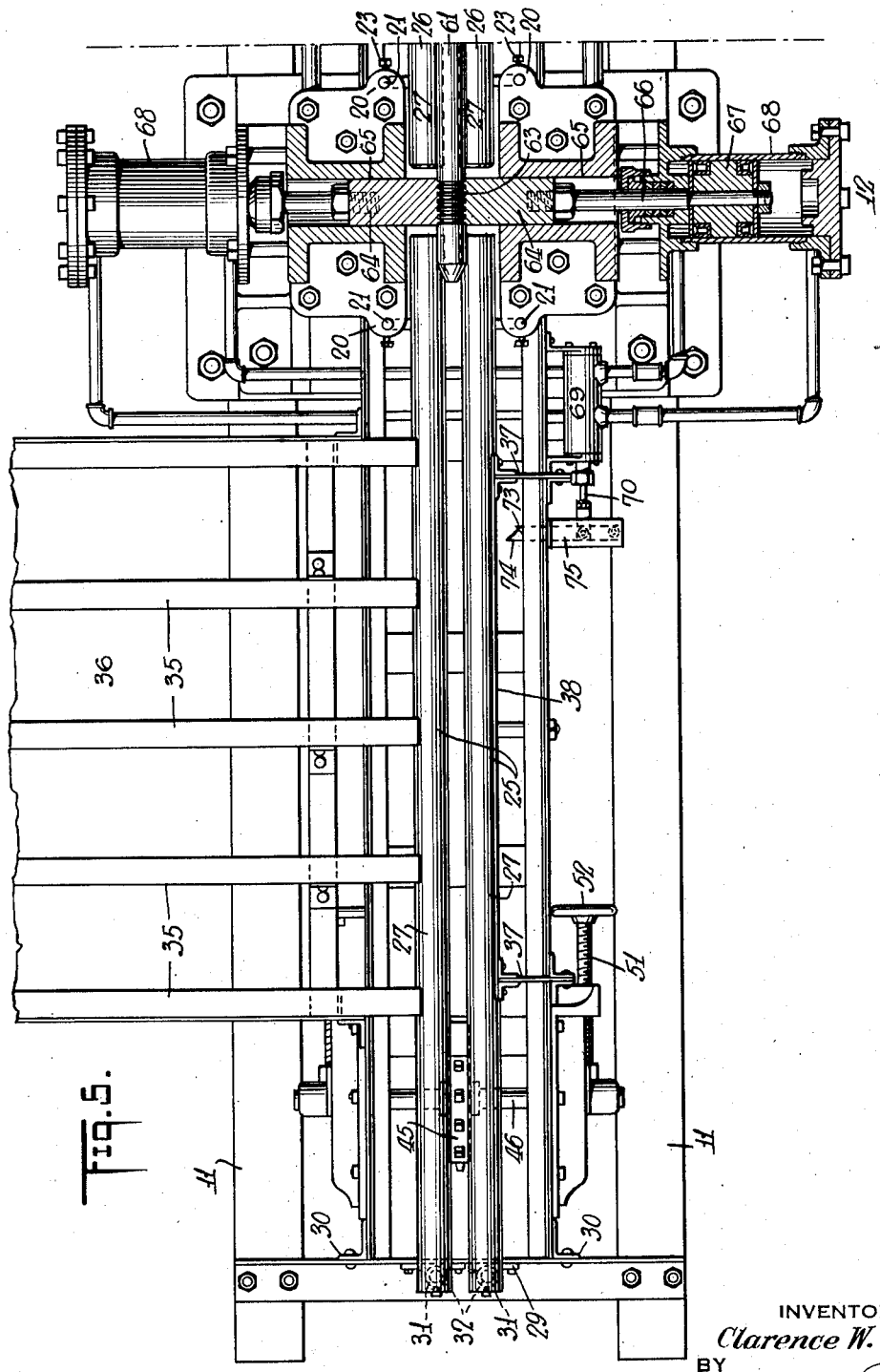
INVENTOR
Clarence W. Vogt
BY
ATTORNEYS

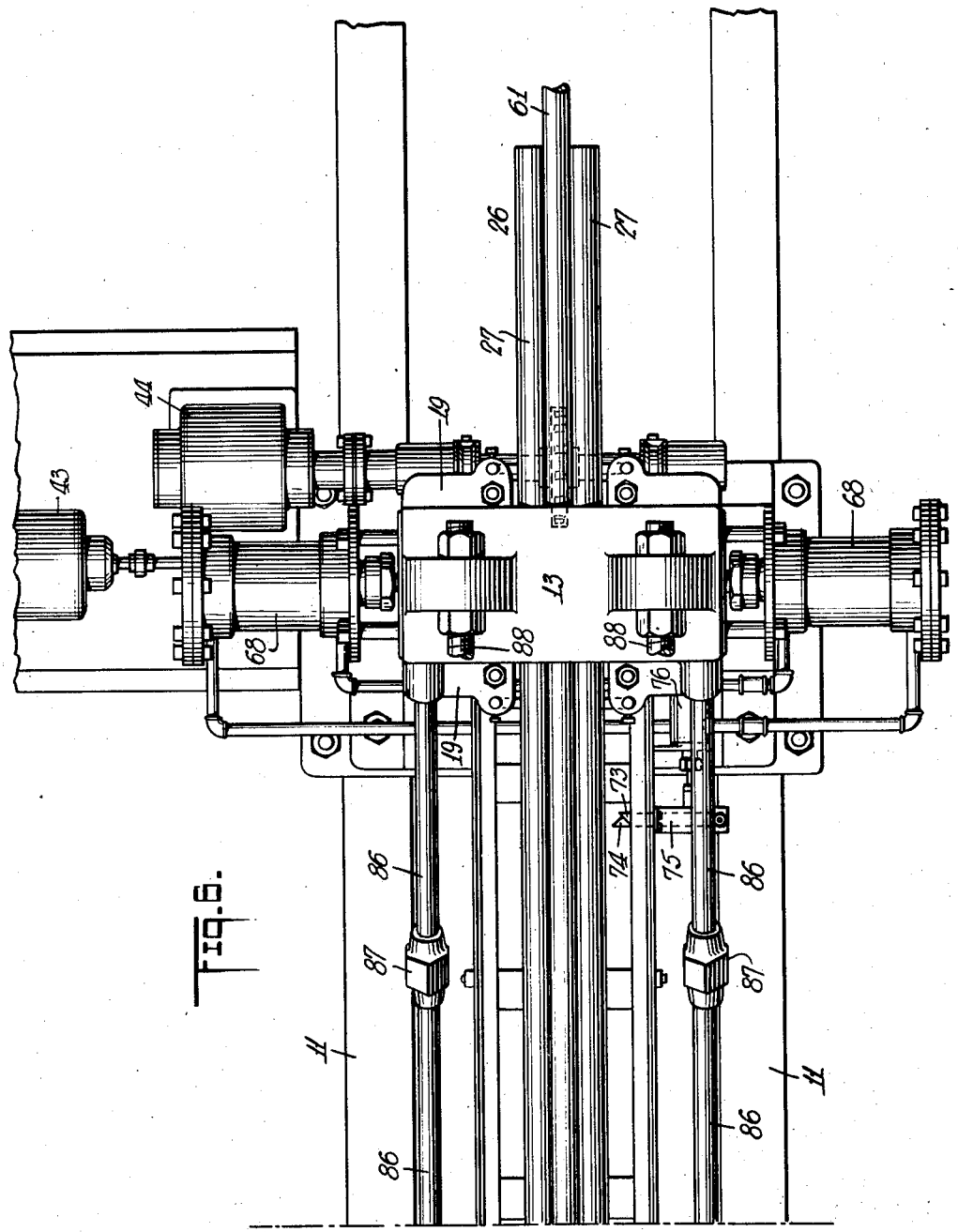

July 18, 1933.  C. W. VOGT  1,918,356
MACHINE FOR FEEDING AND SHAPING METALLIC TUBES
Filed May 16, 1930   9 Sheets-Sheet 5
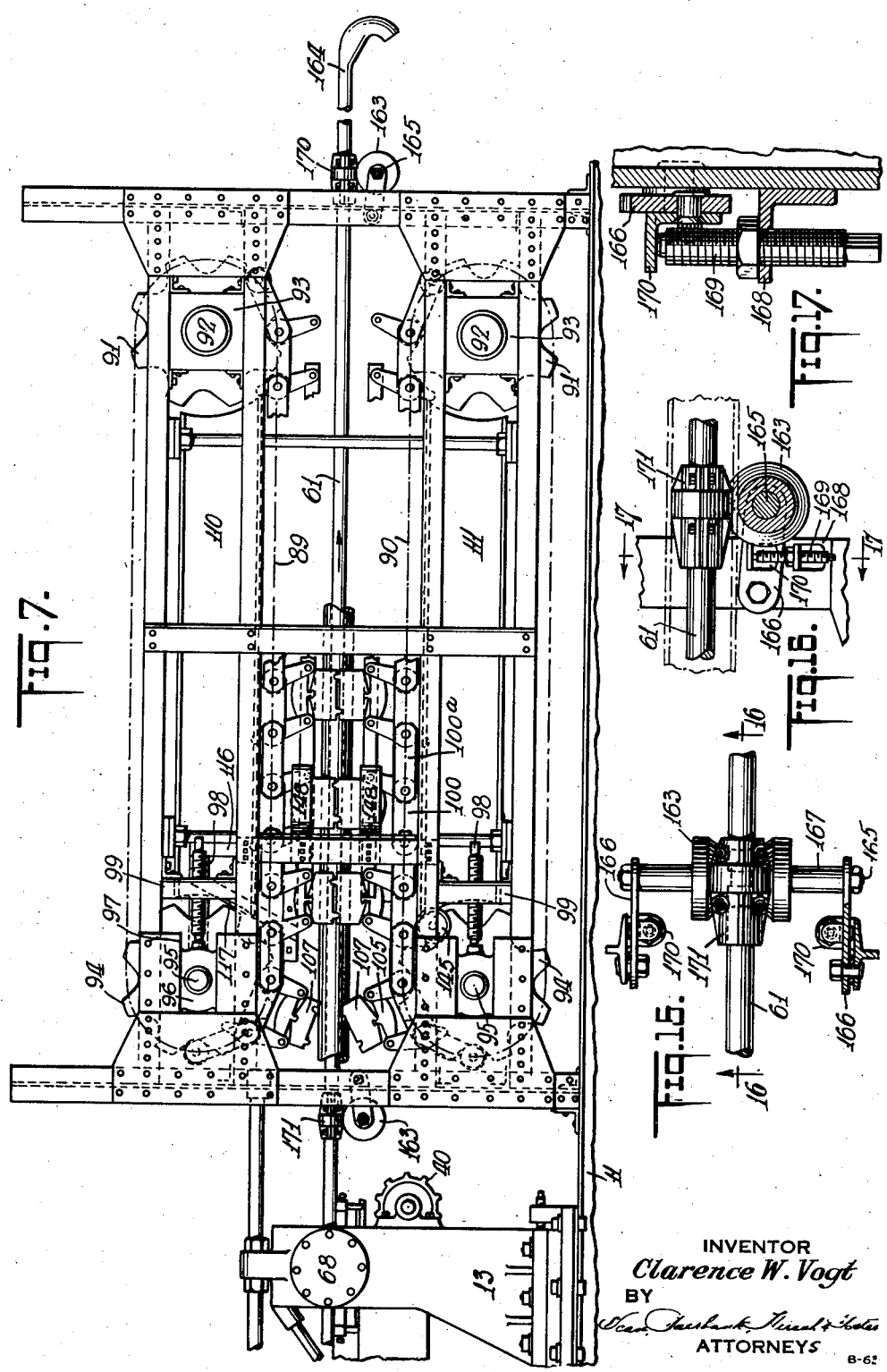
INVENTOR
*Clarence W. Vogt*
BY
ATTORNEYS

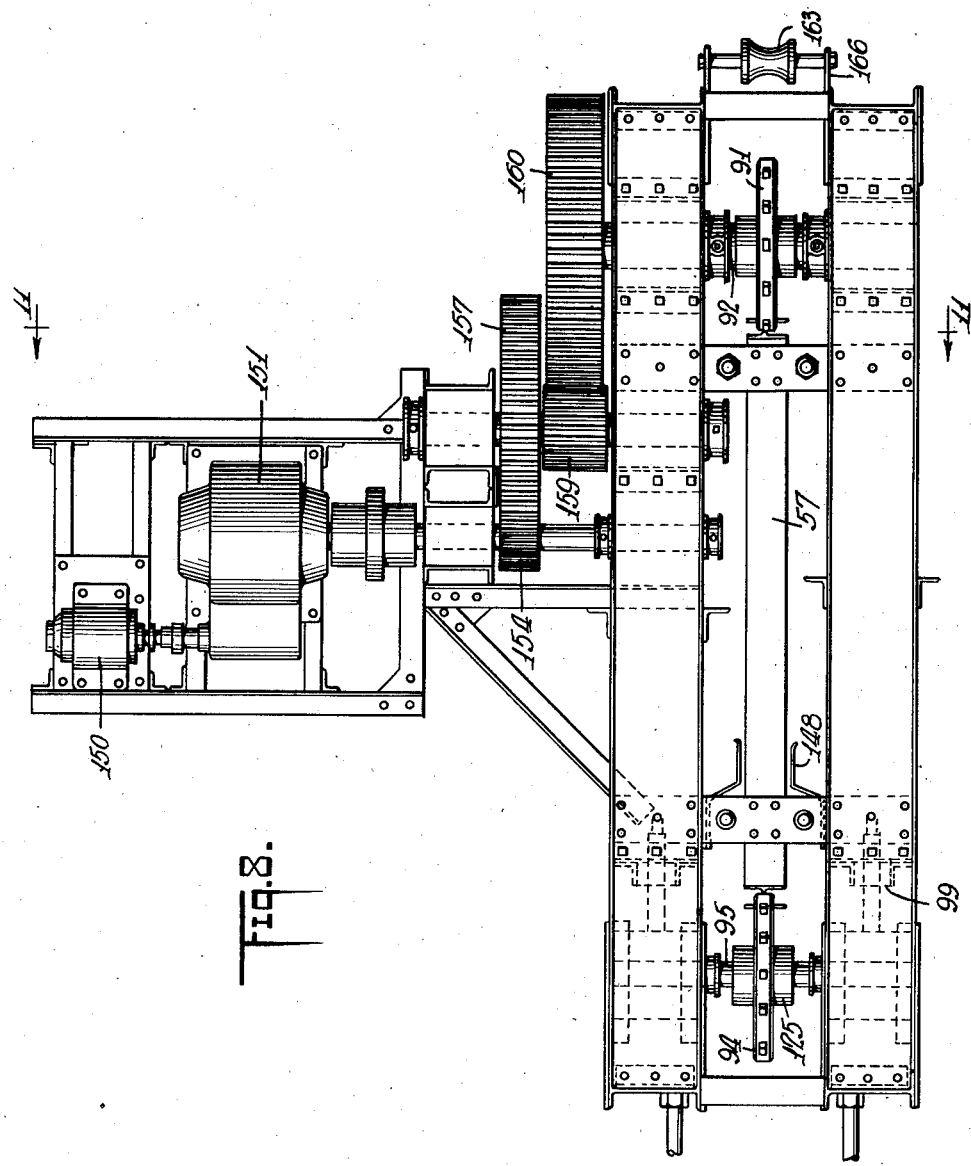

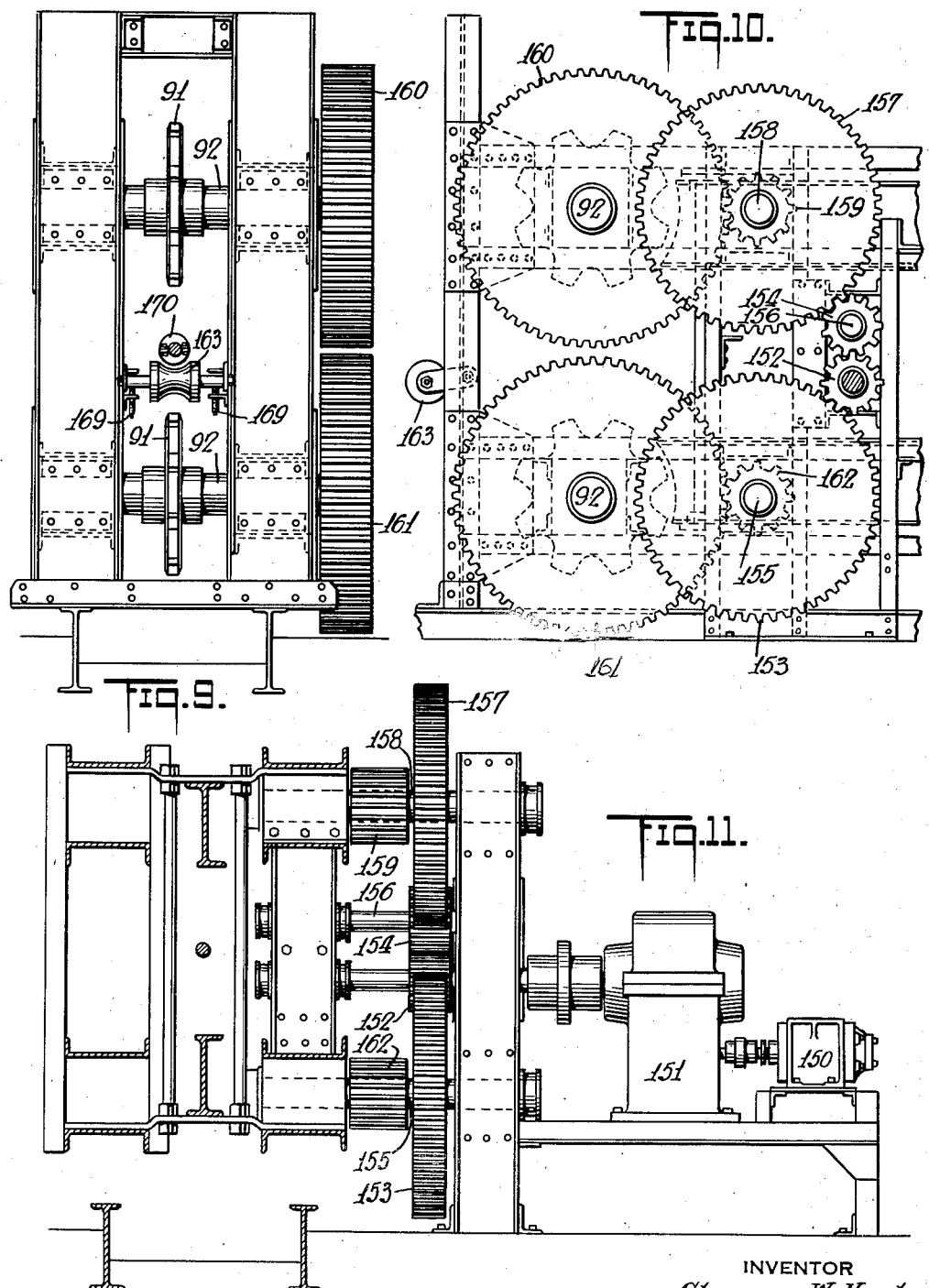

July 18, 1933.  C. W. VOGT  1,918,356
MACHINE FOR FEEDING AND SHAPING METALLIC TUBES
Filed May 16, 1930   9 Sheets-Sheet 8
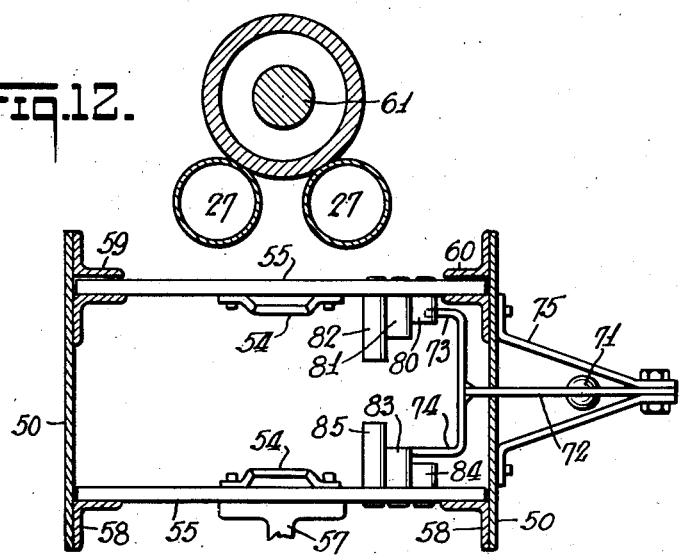
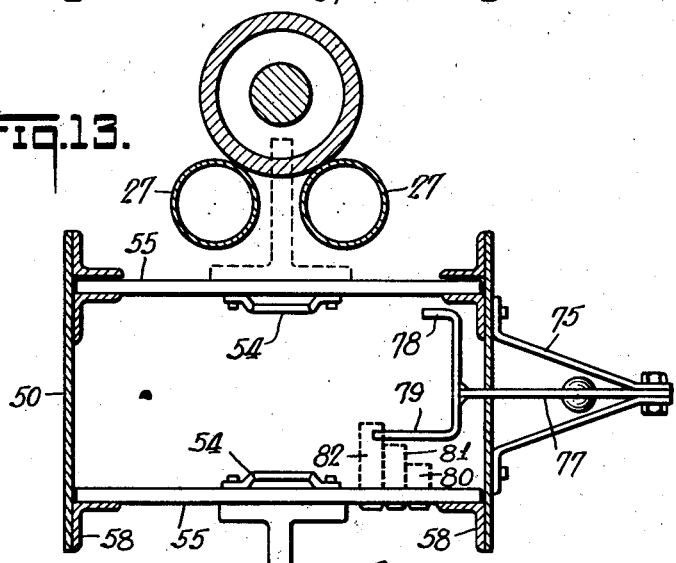
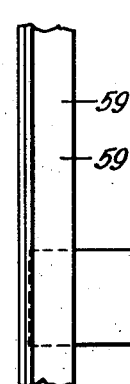
INVENTOR
Clarence W. Vogt
BY
ATTORNEYS July 18, 1933.　　C. W. VOGT　　1,918,356
MACHINE FOR FEEDING AND SHAPING METALLIC TUBES
Filed May 16, 1930　　9 Sheets-Sheet 9
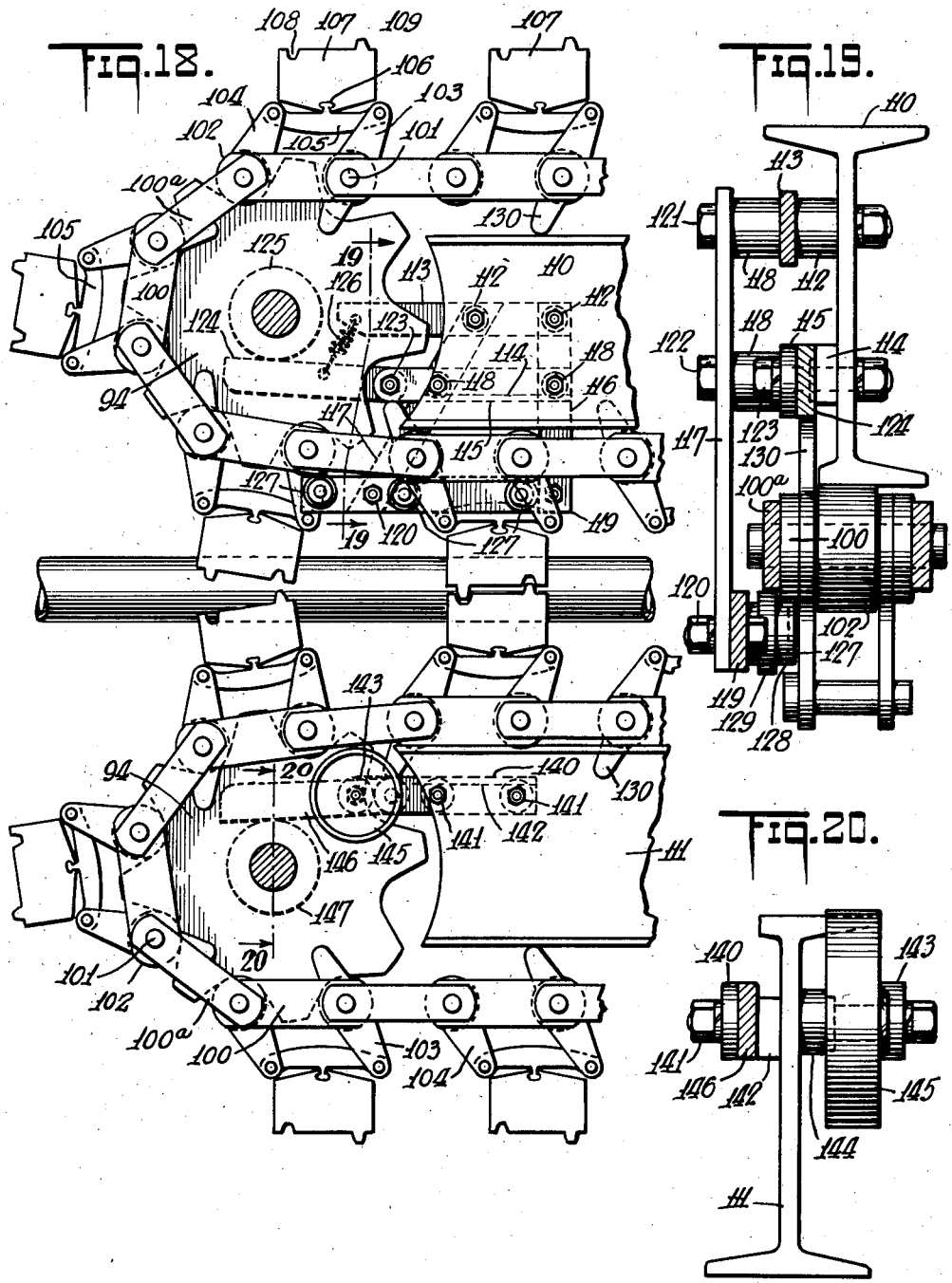
INVENTOR
Clarence W. Vogt
BY
ATTORNEYS Patented July 18, 1933

1,918,356

UNITED STATES PATENT OFFICE

CLARENCE W. VOGT, OF LOUISVILLE, KENTUCKY, ASSIGNOR TO THE GIRDLER CORPORATION, OF LOUISVILLE, KENTUCKY, A CORPORATION OF DELAWARE

MACHINE FOR FEEDING AND SHAPING METALLIC TUBES

Application filed May 16, 1930. Serial No. 452,840.

This invention relates to the art of shaping metallic tubes and more particularly to a new and improved machine for forcing tubes over forming mandrels to expand the tubes, produce tube bends, and the like.

The present invention provides means whereby a plurality of tubes are successively and continuously urged towards the field of action of a pressure feeding unit where they are forced over a fixedly mounted die mandrel and expanded and/or formed in accordance with the shape of the deformation of said mandrel. The deformed end of the die mandrel may be of the type disclosed in United States Patent No. 1,353,714.

The present invention also provides means for continuously locking the mandrel rod secured to the die mandrel against longitudinal displacement while successive pipes are being continuously forced therealong.

The invention still further provides a machine for shaping tubes by continuously forcing a plurality of such tubes successively over a die mandrel while constantly holding said mandrel against longitudinal movement.

In accordance with a concrete exemplification of the present invention, a primary feeding arrangement is provided having a plurality of sets of restraining elements adapted to cooperate with the mandrel rod so as to hold the same in place. A conveyor or other suitable means is employed for advancing the tubes along the mandrel rod in encompassing relationship therewith and control means are provided operable in accordance with the longitudinal position of said tubes for alternately releasing and closing said restraining elements to permit the unobstructed advancement of the tubes along the mandrel rod and into the field of action of a pressure feeding unit, while said mandrel rod is under continuous locking influence. The pressure feeding unit has means associated therewith for continuously forcing a plurality of tubes successively over the end of the die mandrel. The mandrel rod, under these conditions, will be continuously under the influence of a longitudinal tube shaping force, but will be confined in position irrespective of the continuous advancement of the tubes therealong.

The invention also consists in certain new and important features of construction and combinations of parts, more particularly set forth in the claims.

Although the novel features which are believed to be characteristic of this invention will be particularly pointed out in the appended claims, the invention itself, as to its objects and advantages, the mode of its operation and the manner of its organization may be better understood by referring to the following description taken in connection with the accompanying drawings forming a part thereof, in which Fig. 1 is a diagrammatic view showing an elevational setup of the primary feeding unit of a preferred embodiment of the present invention.

Fig. 2 is a side elevation, partly in section, of part of the primary feeding unit of the machine.

Fig. 3 is a side elevation showing the remainder of the primary feeding unit shown in Fig. 2.

Fig. 4 is an end elevation of the primary feeding unit of the machine.

Fig. 5 is a top plan view partly in section of a part of the primary feeding unit of the machine.

Fig. 6 is a top plan view of the remaining part of the primary feeding unit shown in Fig. 5.

Fig. 7 is a right side elevation of the pressure feeding unit.

Fig. 8 is a top plan view of the pressure feeding unit with certain parts thereof omitted.

Fig. 9 is a front end elevation of the pressure feeding unit.

Fig. 10 is a left side elevation of the pressure feeding unit.

Fig. 11 is a section taken on line 11—11 of Fig. 8.

Figs. 12 and 13 are sections taken on line 12—12 and 13—13 respectively of Fig. 1.

Fig. 14 is a top plan view of part of the conveying system shown in Figs. 12 and 13 with its associated hydraulic valve control.

Fig. 15 shows details of the roller arrangement supporting the tubes at the end of the pressure feeding unit.

Fig. 16 is a section taken on line 16—16 of Fig. 15.

Fig. 17 is an enlarged section taken on line 17—17 of Fig. 16.

Fig. 18 is a right side elevation showing details of one end of the conveyor system associated with the pressure feeding unit, and Figs. 19 and 20 are sections taken on line 19—19 and 20—20 respectively of Fig. 18.

Like reference characters denote like parts in the several figures of the drawings.

In the following description and in the claims parts will be identified by specific names for convenience, but they are intended to be as generic in their application to similar parts as the art will permit.

In the specific exemplification of the present invention shown, the primary tube feeding unit is supported on a suitable foundation 10 which is preferably constructed of concrete and which has embedded therein a pair of interspaced I beams 11. Mounted on these I beams in spaced relationship are two duplicate buttress units 12 and 13, the functions of which will be hereinafter made manifest. Each of these units comprises a plate 14 riveted or otherwise secured to the I beams 11, and having secured thereto by means of bolts 15 a base member 16. This base member 16 is provided with a guide channel 17 for the reception therein of a base 18 constituting part of the frame structure of these buttresses 12 and 13.

Means are provided for supporting suitable rails for the advancing tubes and may take the form of rail supports 19 comprising brackets 20 integrally extending from the frame structure of the buttresses and provided with bores 21. Depending from each bracket 20 is an angled member 22, one arm of which passes through the bore 21, where it is confined by means of a set-screw 23. Embracing the other arm of each angled member 22 is a bar 24, the upper portion of which has a cylindrical contour for the fixed reception thereon of a tube 27 constituting part of cylindrical skid rail units 25 and 26. These rail units consist of two longitudinal rows of tubes 27 transversely interspaced.

The extreme lefthand end of the skid rail unit 25 is supported by means of a suitable rail support 28. This rail support is preferably mounted on a plate 29 extending between two upright members 30 secured to the I beams 11, and may comprise a bracket having mounted thereon two bearing blocks 31 adapted to receive a pair of spindles 32, the upper portions of which have secured thereto blocks 33 having surfaces which conform with the cylindrical surfaces of the tubes 27. Passing through the bearing blocks 31 are set-screws 34, the ends of which impinge on the spindles 32 and serve to lock them in selective positions.

Secured to the frame structure of the machine is a plurality of inclined angle irons 35 which conjointly serve as a storage rack 36 for the tubes to be shaped. These tubes gravitate along the members 35 until they are disposed between the interspaced tubes 27 of the skid rail unit 25.

Secured to the frame structure of the machine are two uprights 37 having a plate 38 extending therebetween. This arrangement serves as a detent against any tendency for the tubes as they gravitate along the inclined rack 36 to extend beyond the edge of the skid rail unit 25. It should be noted that a tube upon this skid rail unit 25 prevents the remaining tubes in the rack 36 from rolling forward until this tube has been advanced out of the path of the succeeding tubes.

In order to provide means for advancing the tube along the skid rails 25 and 26 a conveyor system 39 has been provided. This conveyor system preferably comprises a sprocket wheel 40 (Figs. 3, 4, and 6) which is mounted at one end of the system and which is carried by a shaft 41, the ends of which are journaled in bearing brackets 42 secured to the frame structure of the buttress 13. This shaft 41 is connected to a motor 43 through the interposition of a suitable reducing unit 44. On the other end of the conveyor system 39 there is provided a sprocket wheel 45 (Figs. 2 and 5) mounted on a shaft 46, the ends of which are journaled in bearing blocks 47. To provide a suitable means for taking up the slack of the conveyor system 39, these bearing blocks 47 are preferably slidably mounted in guides 48 formed by U-shaped yokes 49 and plates 50, these plates being secured to the frame structure of the machine. Rotatably mounted with respect to each bearing block 47, but not otherwise displaceable therewith is one end of a threaded spindle 51, the other end of which terminates in a hand-wheel 52. Each spindle 51 has a threaded engagement with a crosshead 53 bridging the ends of its respective yoke 49 so as to provide means for tightening or taking up the slack of a conveyor chain 54 in response to the rotation of the hand-wheel 52.

The conveyor chain 54 is mounted on the sprocket wheels 40 and 45 and has secured thereto a plurality of slats 55 (Figs. 1, 12 and 13) upon which are mounted dogs 56 and 57 equally interspaced along said chain. The lower run of the slats 55 is guided between the plates 50 and rides along suitable guide rails which may take the form of angle irons 58 secured to said plates. The upper run of the slats 55 is preferably guided between two pairs of angle irons 59 and 60 secured to the plates 50.

The guide rails 58 are curved upwardly near the sprockets 40 and 45 so that the distance between the upper and lower run of the conveyor system 39 is smaller than the pitch diameter of these sprockets. By means of this arrangement a smaller opening is required in the buttresses 12 and 13 for the passage therethrough of the conveyor chain 54 thereby obviating undue weakening of the frame structure of these buttresses.

The dogs 56 and 57 as they travel along the upper run of the conveyor chain 54 extend beyond the space between the adjoining tubes 27 of the skid rails 25 and 26. As soon as they come opposite the lefthand end (Figs. 2 and 3) of the inclined rack 36, they engage the end of the tube resting on the skid rail 25 and advance it therealong.

Disposed in parallel relationship with the tubes of the skid rails 25 and 26, and spaced therefrom is a mandrel rod 61 having a die mandrel attached to one end thereof, said die mandrel being deformed in accordance with the ultimate shape of the tube desired. This deformation may take the form disclosed in United States Patent No. 1,353,714. The advancing tube to be bent is advanced through an opening 62 in the buttress 12 and into encompassing relationship with said mandrel rod 61. The position of tubes 27 constituting the skid rails 25 and 26 should be set with respect to the mandrel rod 61 so that said rod will be centrally disposed with respect to the advancing tube. This position of the tubes 27, which is determined in accordance with the size of the tube to be shaped, is established through the adjustment of rail supports 19 and 28.

The tubes to be shaped are advanced along the skid rail 25, then along the skid rail 26 into encompassing relationship with the mandrel rod 61, and finally into the field of action of the pressure feeding unit shown in Figs. 7-11, where these tubes are then forced over the die mandrel 164. These pipes are fed continuously and succesively into the field of action of this pressure feeding unit so that this unit is continuously forcing tubes over the shaping mandrel. It should be noted from this operation that the mandrel rod 61 will be in continuous longitudinal stress so that means must be provided for continuously holding said rod against the tube drawing tendency of the pressure feeding unit. The mandrel rod is accordingly provided with serrations 63 at those portions thereof adjoining the center line of the buttress 12 and 13. Co-operating with these serrations on opposite sides thereof are a pair of holding or restraining elements which may take the form of gripping jaws 64, the co-operating surfaces of which are serrated to conform with the serrations 63 on said mandrel rod 61. Each gripping element 64 is reciprocated in a suitable guide opening 65 and has secured to one end thereof one end of a piston rod 66, the other end of which has mounted thereon piston 67 adapted to reciprocate in cylinder 68. In buttress 12, this piston 67 is actuated by suitable fluids such as oil, and has the movements thereof controlled by means of a hydraulic control valve 69. This hydraulic valve 69 controls the operation of both gripping elements 64 of buttress 12 so as to actuate them in unison and has slidably mounted therein a piston, the position of which is controlled by a piston rod 70 one end of which is pivotally connected at 71 to the medial portion of a lever 72 (Figs. 2 and 12). This lever 72 has one end thereof terminating in a yoke arrangement constituted by a pair of prongs 73 and 74. The other end of the lever 72 is pivotally mounted to a bracket 75 secured to one of the plates 50.

The buttress 13 is provided with a pair of gripping elements (not shown) similar to the gripping elements 64 and similarly controlled by a hydraulic valve arrangement 76 (Figs. 3 and 6). This valve arrangement 76 has associated therewith a lever 77 (Fig. 13) terminating at one end in a pair of prongs 78 and 79, and mounted similarly to the lever 72.

The hydraulic control valves 69 and 76 are cyclically operated so as to continuously maintain at least one pair of gripping elements 64 of the buttresses in co-operative relationship with the mandrel rod 61. This arrangement serves to continuously hold said mandrel rod 61 against longitudinal movement regardless of the passage thereover of the tubes to be shaped. For this purpose, the conveyor slats 55 have secured thereto pins 80, 81, 82, 83, 84 and 85. (Figs. 1, 12 and 13.) These pins are graduated in size as shown in Figs. 12 and 13, and are spaced along the conveyor system 39 as shown in Fig. 1. In the operation of this system, as soon as the tube to be shaped has gravitated along the inclined rack 36 to the skid rails 25, the dog 56 will engage the end thereof in the initial position A shown in Fig. 1. In this particular position during this step in the operation of the conveyor system 39, the buttress 12 will be open, i. e., the gripping elements 64 associated therewith will be spread sufficiently apart to permit a free passage of the tube therethrough. The tube which is initially positioned at "A" will be advanced by the engaging dog 56 through the buttress 12 and into the position indicated at "B". When the tube will have reached this position "B", the pin 83 in the lower run of the conveyor chain 54 will have reached a position to actuate the prong 74 about its fixed pivot point. It should be noted that the prong 74 is sufficiently long to engage only the pins 81 and 83. The engagement of the prong 74 will cause the piston rod 70 to move in a position to actuate the gripping elements 64 of buttress 12 into co-operative relationship with the mandrel rod 61, so that said rod will be gripped thereby. The tube will then move from position "B" to position "C". It should be noted that during the movement of the tube from the position "B" to the position "C" both buttresses 12 and 13 are closed. As soon as the tube has reached the position "C" the pin 80 will have reached the prong 78 of the lever 77 and actuated the hydraulic control valve 76 so as to open the buttress 13. This will permit the tube to travel through the buttress 13 and into the position indicated at "D". It should be observed that during the travel of the tube from the position "C" to the position "D" the buttress 12 will be closed. When the pipe has reached the position "D", the dog 57 will have reached the position indicated at "E". This dog 57 will continue to move around the sprocket 45 until it has reached the position to engage another tube in the position "A". As soon as the dog 57 will have reached this position, the pin 84 will have passed into the upper run of the conveyor and engaged the prong 73 associated with the control valve 69. This will cause the gripping elements 64 of the buttress 12 to release the mandrel rod 61 so as to permit the travel of the second or newly engaged tube through this buttress. After this second tube has reached the position indicated at "B" the pin 81 will have advanced to the lower run of the conveyor and into engaging position with prong 74 of the hydraulic control valve 69 connected with buttress 12. This will cause the gripping elements 64 associated with said buttress to move back into closing position. The further advance of the pipe from the position "B" to the position "C" will bring the pin 84 around to the upper run of the conveyor and into engaging position with the prong 78 of the control valve 76. This will cause the buttress 13 to open and to permit the passage therethrough of the second tube into the position "D". While this second tube is in the position indicated at "D", the dog 56 will have reached the position indicated at "E". During the travel of the dog 56 from the position E into its initial operating position, the hydraulic systems connected with the gripping elements 64 of the buttresses are inactive. As soon as the dog 56 will have reached its initial operating position at "A" as shown in Fig. 1, the pin 80 will have moved into a position to engage the prong 73 of the lever 72, so as to open the buttress 12 and permit the passage of another tube therethrough. It should be noted that the prong 73 will engage the pins 80 and 84; the prong 74 will engage the pins 81 and 83; the prong 78 will engage the pins 80 and 84; and the prong 79 will engage the pins 82 and 85. It should also be noted that two tubes are advanced during one revolution of the conveyor system 39. It should still further be noted that the mandrel rod 61 is continuously under a restraining force of either one or the other of the buttresses 12 and 13.

The continuous tension force applied by the pressure feeding unit of the machine will cause a slight elongation or permanent set in the mandrel rod 61. This, and perhaps other influences, will effect the displacement of the serrations 63 out of conforming relationship with the serrations on the co-operating surfaces of the gripping elements 64. Under these conditions, it will be necessary to adjust the relative position of the buttresses to allow for such elongations or other displacing influences. For this purpose, the two buttresses are connected by angular tie rods 86 jointed together by turn buckles 87. The top portions of the buttresses are connected together by horizontally extending tie rods 88, and very fine adjustment of the relative position of the individual buttresses 12 and 13 is effected by means of set screws 88$^a$ passing through the base plates 16 and impinging on the base members 18 of the buttresses.

After the tubes have passed through the buttress 13, they will be advanced into the field of action of the pressure feeding unit shown in Figs. 7 and 11. The frame structure of this unit is secured to the I beams 11, and has mounted thereon two duplicate conveyor units 89 and 90. Each of these units 89 and 90 comprises at one end a sprocket wheel 91 mounted on a shaft 92, the ends of which are journaled in bearing blocks 93 secured to the frame structure of the unit. The other end of each conveyor unit is provided with a sprocket 94 mounted on a shaft 95, the ends of which are journaled in bearing blocks 96. To provide suitable means for taking up the slack on the conveyor chain these bearing blocks 96 are slidably mounted in guideways 97 defined by the frame structure of the machine. Each one of said blocks 96 has rotatably connected therewith, but not otherwise displaceable therefrom, one end of a threaded spindle 98, the other end of which terminates in a square portion for the reception of a socket or suitable turning tool. This spindle 98 has a threaded engagement with a crosshead member 99, connected to the frame structure of the machine and serves to take up or tighten any slack in the conveyor chain associated with each unit 89 and 90. The conveyor chain of the units 89 and 90 comprise a plurality of links 100 and 100$^a$ pivotally connected together at their ends by means of pintles 101. These pintles 101 have loosely mounted thereon rollers 102 and arms 103 and 104, these arms being disposed in pairs adjacent both ends of each roller. Every two adjoining pairs of arms 103 and 104 are pivotally joined by a cross member 105, the medial portion of which is provided with a tongue 106. Frictionally or otherwise engaged in said tongues 106 is a shoe 107 having a cylindrical contour in accordance with the contour of the tube to be shaped, and having a notch 108 and a tongue 109 which co-operate and engage the corresponding tongue and notch respectively of an opposite shoe on the other conveyor system. These shoes 107 are slipped into engaging relationship with the tongues 106 and held therewith by friction or other suitable means. This arrangement permits the shoes 107 to be easily slipped out of engagement with the tongues 106 and replaced by different size shoes in accordance with the size of the tubes to be shaped.

In order to progressively advance the shoes 107 associated with the conveyor unit 89 into predetermined angular relationship with the advancing tubes, there is provided means (Figs. 18–20) including a pair of vertically interspaced I beams 110 and 111 suitably secured to the frame structure of the machine. Mounted on the upper I beam 110 and spaced therefrom by a pair of spacing nipples 112 is a horizontally extending bar 113. Also mounted on this I beam 110 and in abutting relation thereto is a bar 114. Disposed proximate this bar 114 is a bar 115, the bottom edge of which extends below the bottom edge of said bar 114. Also secured to the I beam 110 are bars 116 and 117 which are spaced from the bars 113 and 115 by spacing nipples 118. The bottom portion of these bars 116 and 117 are secured together by a bar 119 by means of bolts 120. All of these bars are tied together to effect a rigid link structure and are secured to the I beam 110 by means of bolts 121 and 122.

Pivotally connected to the end of the bar 115 by means of a pivot pin 123 is a bar 124, the top edge of which is urged into continuous contact with the hub 125 of the sprocket 94, through the agency of a spring 126 connecting said bars 113 and 124. Rotatably mounted with respect to the lower bar 119 are three members 127 each of which is provided with two cylindrical surfaces 128 and 129.

Each arm 103 has an extension 130 which contacts with the lower edge of the bar 124 as it advances into the lower run of the conveyor system 89. This extension 130 will ride along the edge of the bar 124 which is inclined to effect a progressive change in the angular position of the shoes 107 until said extension reaches the pivoted end of said bar. By that time the shoes 107 of the conveyor unit 89 will have come into co-operative relation with the shoes of the other unit 90. The edges of the links 100 and 100ᵃ will ride on the roller surfaces 128 and 129 respectively of the member 127, and while these links are riding on these roller surfaces, the rollers 102 are riding on the flange of the I beam 110.

In order to effect the progressive advancement of the shoes 107 of the lower conveyor system 90 into predetermined angular relationship to the advancing tubes, a different arrangement is provided. This includes a bar 140 secured to one side of the I beam 111 by means of bolts 141 and spaced therefrom by a bar 142, the top edge of which is disposed lower than the top edge of said bar 140. Disposed on the other side of the I beam 111 is a bar 143 which is spaced from said I beam 111 by means of spacing nipples 144. Rotatably mounted on the end of said bar 143 is a roller 145 and pivotally mounted on the end of the bar 140 is a bar 146 the bottom edge of which is continuously in contact with the hub 147 of the lower sprocket 94.

As the chain moves into the upper run of the conveyor system, the extensions 130 ride along the edge of the bar 146 until they come to the end of said bar. In the meantime, the lower edges of the links 100 ride along the periphery of the roller 145 so that the shoes are progressively advanced into predetermined angular relationship corresponding to the angular relationship with which the upper shoes 107 are being advanced.

As the shoes 107 come into friction holding relationship with the tube to be forced they pass between spring plates 148 secured to the frame structure of the machine (Figs. 7 and 8). These spring plates 148 serve as guides for said shoes 107 until these shoes are in full gripping relationship with said tubes.

It should be noted that the distance between the oppositely disposed pintles 101 on each side of the two conveyor systems 89 and 90 when the shoes 107 associated with these pintles are in full co-operative relationship, is shorter than the distance between the pitch circles of the respective sprockets. This relationship is effected by causing the rollers 102 to ride on the flanges of the two oppositely disposed I beams 110 and 111 which not only serve to bring each pair of co-operating shoes 107 into more intimate contact with the tubes to be shaped, but also serve to sustain the force exerted on the shoes transversely to the line of travel of the tubes.

For the purpose of driving the conveyor units 89 and 90 a suitable driving source of power with an associated gear train is provided as shown in Figs. 8 and 11. This driving source of power preferably takes the form of hydraulically operated variable speed motor 150 having a constant torque. This motor 150 is connected to a suitable reducer unit 151, the shaft of which has connected thereto a gear 152. This gear 152 drives gears 153 and 154 which are mounted on suitable journaled shafts 155 and 156 respectively. The gear 154 meshes with a gear 157, the shaft 158 of which carries a gear 159. This gear 159 drives a gear 160 mounted in overhung relationship on the shaft 92 of the conveyor system 89. The shaft 92 of the other conveyor system 90 also carries a gear 161 in overhung relationship, this gear meshing with a gear 162 mounted on the shaft 155. By means of this gear train arrangement, the torque of the motor 150 is transmitted to the conveyor units 89 and 90 to a greatly multiplied degree with a consequent decrease in linear speed.

The tubes are drawn along the mandrel rod 61 through the instrumentality of the shoes 107 and then forced over a supporting roller 163 and to the die mandrel 164. This die mandrel 164 may be disposed in a furnace or the tube may be heated in any other suitable manner so as to facilitate the bending of the tubes. The die mandrel is screwed or otherwise secured to the mandrel rod 61 so that it can be easily removed and replaced by another one in accordance with the size of the tube to be forced or the degree of bend required.

The supporting roller 163 is carried by a shaft 165 each end of which is secured to one end of a bracket arm 166, the other end of which is pivotally mounted to the frame structure of the machine. The roller 163 is spaced from these brackets 166 by means of spacers 167. Also secured to the frame structure of the machine are brackets 168 which have threaded engagements with adjusting screws 169, the ends of which impinge on clips 170 secured to the bracket arms 166. This arrangement serves to selectively position the roller 163 so as to accommodate it to any size tubes to be shaped.

The mandrel rod 61 above the roller 163 has clamped thereon a split sleeve 170 having an outside diameter slightly smaller than the inside diameter of the tubes to be shaped. A similar split sleeve 171 is attached to the mandrel rod 61 near the entrance to the pressure feeding unit. These sleeves 170 and 171 are split so that they can be easily removed and replaced by other sleeves in accordance with the diameter of the tubes to be shaped.

It should be noted that the chain of the conveyor system 39 may have a linear speed which is faster than the linear speed of the pressure feeding chain of the conveyors 89 and 90 so that the tubes are fed to the pressure feeding unit at a higher rate than said unit can carry them through to the mandrel 164. Consequently, the last tube under these conditions offers an obstruction to the passage of the tube being fed to it so that the feed conveyor 39 must be slowed down to the speed of the pressure feeding unit until either dog 56 or 57 disengages itself from the advancing tube. This disengagement causes the feed conveyor 39 to resume its normal speed until the opposite dog brings another tube from the rack in contact with the last tube fed to the pressure feeding unit. This periodic slowing down of the feed conveyor 39 is provided for by the motor 43 which is preferably of the Waterbury hydraulic variable speed transmission type or other so-called "torque" motor type. This type of motor may be stopped entirely without overheating and it continues to exert its full turning effect or torque until the hindrance has been removed. It then resumes its normal rated speed.

Although certain novel features of the invention has been shown and described and are pointed out in the annexed claims, it will be understood that various omissions, substitutions and changes in the form and details of the apparatus illustrated may be made by those skilled in the art without departing from the spirit of the invention.

Having thus described my invention, what I claim as new and desire to secure by Letters Patent is:

1. A machine for shaping tubes, including a mandrel rod, a die mandrel at the end thereof deformed in accordance with the ultimate shape of the tubing, drawing means for continuously forcing a plurality of tubes successively over said deformed end of the mandrel rod, a conveyor for continuously advancing a plurality of tubes successively into the field of action of said drawing means, two sets of restraining elements cooperating with said mandrel rod, means cyclically actuated in response to the operation of said conveyor for alternately releasing and closing said restraining elements to permit free and unobstructed passage of the advancing tube along said rod while said rod is continuously under restraining influence of one or the other of said sets of restraining elements.

2. A machine for shaping tubes, including a mandrel rod, a die mandrel at the end thereof, means for continuously forcing a plurality of tubes successively over the deformed end of said mandrel rod, means for continuously advancing said tubes successively into the field of action of said forcing means, a plurality of sets of gripping elements cooperating with said mandrel rod at spaced points therealong, and fluid actuated means operable in accordance with the position of the advancing tubes for alternately releasing and closing said elements whereby said mandrel rod is continuously restrained against longitudinal movement without obstructing the passage of the continuously advancing tubes.

3. A machine for shaping tubes, including a mandrel rod, a die mandrel at the end thereof, means for forcing the tubes over the die mandrel, feeding means for continuously advancing a plurality of tubes successively into the field of action of said last mentioned means, and means whereby said feeding means is permitted to check the advancement of the tubes in accordance with the rate with which the tubes are being forced over the die mandrel.

4. A machine for shaping tubes, including a mandrel rod, a die mandrel at the end thereof, and a pair of conveyors longitudinally disposed on opposite sides of the mandrel rod and having all the runs thereof in one plane, with the two facing runs on opposite sides of said rod parallel to said rod, said conveyors being adapted to frictionally engage the tubes and force them over the die mandrel.

5. A machine for shaping tubes, including a mandrel rod, a die mandrel at the end thereof, a pair of conveyors longitudinally disposed on opposite surfaces of the mandrel rod, shoes on these conveyors adapted to frictionally engage the tubes and force them over the die mandrel, a feeding conveyor for advancing the tubes into the field of action of said shoes, and means whereby said feeding conveyor is operated at a speed depending on the rate with which the tubes are being formed by said shoes.

6. A machine for forming shaped tube sections, including a mandrel rod, a die mandrel at the end thereof, a pair of members at points along the length of the mandrel rod spaced to a distance greater than the length of a tube section for engaging the mandrel rod to hold the latter against longitudinal movement, a conveyor for advancing the tube sections endwise in succession past both of said members and in encompassing relationship to the mandrel rod, means beyond said members for forcing the tube sections over said die mandrel, and means controlled by said conveyor for engaging and disengaging said members alternately whereby said tubes may pass each of said members and said mandrel rod is continuously held against longitudinal movement by one or the other of said members.

7. A machine for forming shaped tube sections, including a mandrel rod, a die mandrel at the end thereof, means for continually feeding onto the opposite end of the mandrel rod a plurality of tube sections in succession, while holding the mandrel rod continuously against longitudinal movement and a pair of endless conveyors having runs at opposite sides of and beyond said first mentioned means for forcing the tube sections off of the mandrel rod and over said die mandrel, all the runs of said conveyors being disposed in one plane, with the facing runs on opposite sides of said first mentioned means parallel to said rod.

8. A machine for forming shaped tube sections, including a mandrel rod, a die mandrel at the end thereof, a pair of separate endless conveyors spaced apart along the length of said mandrel rod and having runs parallel thereto, one of said conveyors serving to feed tube sections onto said mandrel rod at one end, and the other serving to force them off the mandrel rod at the opposite end, and means for holding said mandrel rod against longitudinal movement.

9. A machine for shaping tube sections, including a mandrel rod, a die mandrel at one end thereof, a pair of separate endless conveyors spaced apart along the length of said rod and having runs parallel thereto, one of said conveyors serving to feed tube sections onto said mandrel rod at one end and the other serving to force them off the mandrel rod and past said die mandrel at the opposite end, gripping means for said rod disposed between said conveyors, gripping means for said rod in advance of the first mentioned conveyor, and means for opening and closing said gripping means alternately.

10. A machine for shaping tube sections, including a mandrel rod, a die mandrel at one end thereof, a pair of separate endless conveyors spaced apart along the length of said rod and having runs parallel thereto, one of said conveyors serving to feed tube sections onto said mandrel rod at one end and the other serving to force them off the mandrel rod and past said die mandrel at the opposite end, gripping means for said rod disposed between said conveyors, gripping means for said rod in advance of the first mentioned conveyor, and means actuated by one of said conveyors for opening and closing said gripping means alternately.

11. A machine for shaping tube sections, including a mandrel rod, a die mandrel secured thereto, an endless conveyor disposed adjacent to said rod and having a run substantially parallel to the rod and provided with means for feeding tube sections along said rod, a pair of gripping devices spaced apart along the length of said rod, fluid pressure operated means for actuating said gripping devices, valves for controlling the application of fluid pressure, and means connected to said conveyor for operating said valves to effect the alternate operation of said gripping devices.

12. A machine for shaping tube sections, including a mandrel, a rod secured thereto, a pair of endless conveyors having runs parallel to said rod and upon opposite sides thereof for engaging the tube sections and forcing them over said mandrel, a separate endless conveyor having a run parallel to said rod and provided with means for feeding tube sections to said first mentioned conveyors, and rod gripping means disposed between said first mentioned conveyors and said second mentioned conveyor for holding said rod against endwise movement.

13. A machine for shaping tube sections, including a mandrel, a rod secured thereto, a pair of endless conveyors having runs parallel to said rod and upon opposite sides thereof for engaging the tube sections and forcing them over said mandrel, a separate endless conveyor having a run parallel to said rod and provided with means for feeding tube sections to said first mentioned conveyors, rod gripping means disposed between said first mentioned conveyors and said second mentioned conveyor for holding said rod against endwise movement, and separate means for gripping said rod at another point along the length thereof during the release of the first mentioned gripping means and the feeding of tub sections past the latter.

14. A machine for shaping tube sections, including a mandrel, a rod secured thereto, means for holding said rod against endwise movement, and a pair of endless conveyors having runs parallel to said rod and upon opposite sides thereof, each of said conveyors having a series of gripping shoes mounted along the length thereof for engaging the tube sections and advancing them endwise over the mandrel.

15. A machine for shaping tube sections, including a mandrel, a rod secured thereto, means for holding said rod against endwise movement, a pair of endless conveyors longitudinally disposed on opposite sides of said rod and having runs all in one plane, with the facing runs of said conveyors on opposite sides of said rod parallel to said rod, each of said conveyors having a series of gripping shoes mounted along the length thereof, and guides parallel to said rod for holding said shoes in gripping engagement with the tube sections.

16. A machine for shaping tube sections, including a mandrel rod, a die mandrel secured to the end thereof and having a portion curving laterally in respect to the axis of the rod whereby tube sections forced over the mandrel are deformed from straight to curved shape, and a pair of endless conveyors longitudinally disposed on opposite sides of said rod and having runs all in one plane, with the facing runs of said conveyors on opposite sides of said rod parallel to the rod and adapted to engage the tube sections to force them over the die mandrel.

17. A machine for shaping tube sections, including a mandrel rod, a die mandrel at one end thereof, means for feeding the tube sections unto said mandrel rod at one end, means for forcing said tube sections along said mandrel rod and past said die mandrel, means for gripping said rod while said tube sections are being forced over said die mandrel, and means for opening said gripping means to permit the unshaped tube sections to be fed successively over said rod.

18. A machine for shaping tube sections, including a mandrel rod, a die mandrel at one end thereof, means for feeding said tube sections unto said mandrel rod at one end thereof, means for forcing said tube sections along said mandrel rod and past said die mandrel at the opposite end thereof, gripping means for said rod, and means operable by the movement of said feeding means for opening and closing said gripping means alternately.

CLARENCE W. VOGT.